United States Patent [19]

Harrington et al.

[11] 3,996,451

[45] Dec. 7, 1976

[54] SEMICONDUCTOR DIODE TEMPERATURE SENSING DEVICE

[75] Inventors: Daniel C. Harrington, Fridley; Gerald L. Ahmann, St. Paul; John C. Fox, Coon Rapids, all of Minn.

[73] Assignee: Control Data Corporation, Minneapolis, Minn.

[22] Filed: Oct. 28, 1975

[21] Appl. No.: 626,430

[52] U.S. Cl. .................. 235/92 MT; 235/92 ST; 235/92 R; 73/362 SC
[51] Int. Cl.² ................. G06M 3/08; G01K 7/00
[58] Field of Search ...... 235/92 MT, 92 ST, 92 TF; 324/71 SN; 73/362 SC, 362.4

[56] References Cited

UNITED STATES PATENTS

| | | | |
|---|---|---|---|
| 2,828,468 | 3/1958 | Ball et al. .................. | 235/92 TF |
| 3,426,183 | 2/1969 | Walsh ...................... | 235/92 ST |
| 3,724,534 | 4/1973 | Weatherston ............ | 235/92 MT |
| 3,872,728 | 3/1975 | Joyce et al. ............... | 235/92 MT |

Primary Examiner—Joseph M. Thesz
Attorney, Agent, or Firm—William J. McGinnis, Jr.

[57] ABSTRACT

A temperature sensing device is disclosed in which the temperature sensing element is a semiconductor diode. The reference supply current for the diode is derived from an offset voltage regulator in such a way that power source fluctuations appear as common mode inputs to an operational amplifier. The operational amplifier controls a voltage controlled oscillator. The output pulses of the oscillator are counted over periodic time intervals of predetermined length to produce periodic counts which correlate to temperature. The device is designed in the preferred embodiment for use on commercial alternating current power lines where the length of timing for temperature sensing, the interval between readings and switching between multiple sensors is controlled by the power line frequency.

5 Claims, 3 Drawing Figures

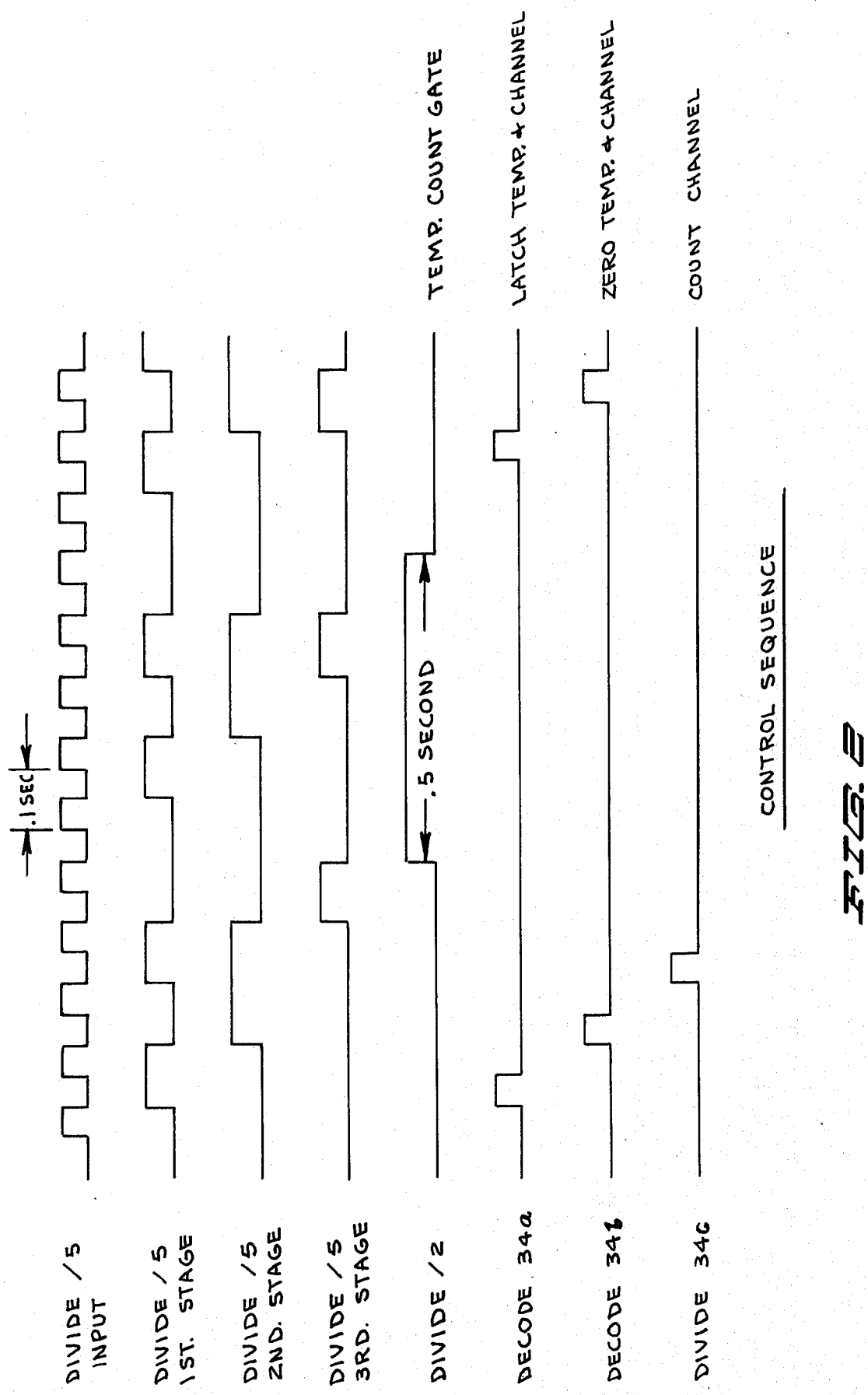

SEMICONDUCTOR DIODE TEMPERATURE SENSING DEVICE

BACKGROUND OF THE INVENTION

This invention relates to temperature sensing devices which electronically produce periodic readings. More particularly, this invention relates to a sensing device employing a semiconductor diode where the well known junction current to temperature relationship operates as the sensing variable.

Numerous electronic temperature sensors have been developed in the last few years most of which are used in scientific, medical and industrial applications. Some are not extremely accurate but are relatively inexpensive, while others are extremely accurate and quite expensive. The present invention is an effort at obtaining a high accuracy without great expense.

Various patents known to applicants show temperature sensitive elements in bridge circuits and units requiring a reference temperature for comparison. The most relevant patents known to applicants' are U.S. Pat. Nos. 3,421,375; 3,440,883; 3,722,283; 3,791,214; 3,812,717; and 3,817,105.

SUMMARY OF THE INVENTION

The present invention is a semiconductor diode temperature sensing device. The device produces an output count correlated to the temperature of the environment in which the sensing diode is located.

A plurality of diodes may be used to sense in cyclical fashion a plurality of different environments by use of a channel switch and logic elements collectively referred to as a multiplexer. From the multiplexer the particular selected diode is connected with an oscillator input circuit.

The oscillator input circuit has an operational amplifier in a configuration to provide a regulated voltage to the sensing diode as well as to offset the normal diode junction voltage to a suitable value for the voltage controlled oscillator to be described. The oscillator input circuit includes a second operational amplifier configured so that power supply fluctuations appear as a common mode input to be cancelled out. The change in sensing diode junction voltage appears on only one input to the second operational amplifier and thus appears in the output of the oscillator input circuit.

A voltage controlled oscillator is connected with the oscillator input circuit and has an output frequency which correlates with the temperature of the sensing diode. The number of output pulses of the oscillator are counted during successive fixed time intervals. Variations in the number of pulses counted in the fixed time interval reflect changes in temperature.

The time intervals for counting the output of the oscillator as well as the periods between intervals (or sampling rate) and the switching rate between channels are all controlled by the commercial alternating current power source for the device. Various step down counters or dividers are used to divide the nominal sixty cycle power supply into, for example, a one half second sampling interval repeated every second. During the one half second non-sampled interval the temperature counter is returned to zero, the count is transferred to a display device and the channel switch is advanced to the next diode to be sampled.

In the figures:

FIG. 1 is a schematic circuit diagram of a device according to the present invention.

DESCRIPTION OF THE PREFERRED EMBODIMENT

Figure 2:
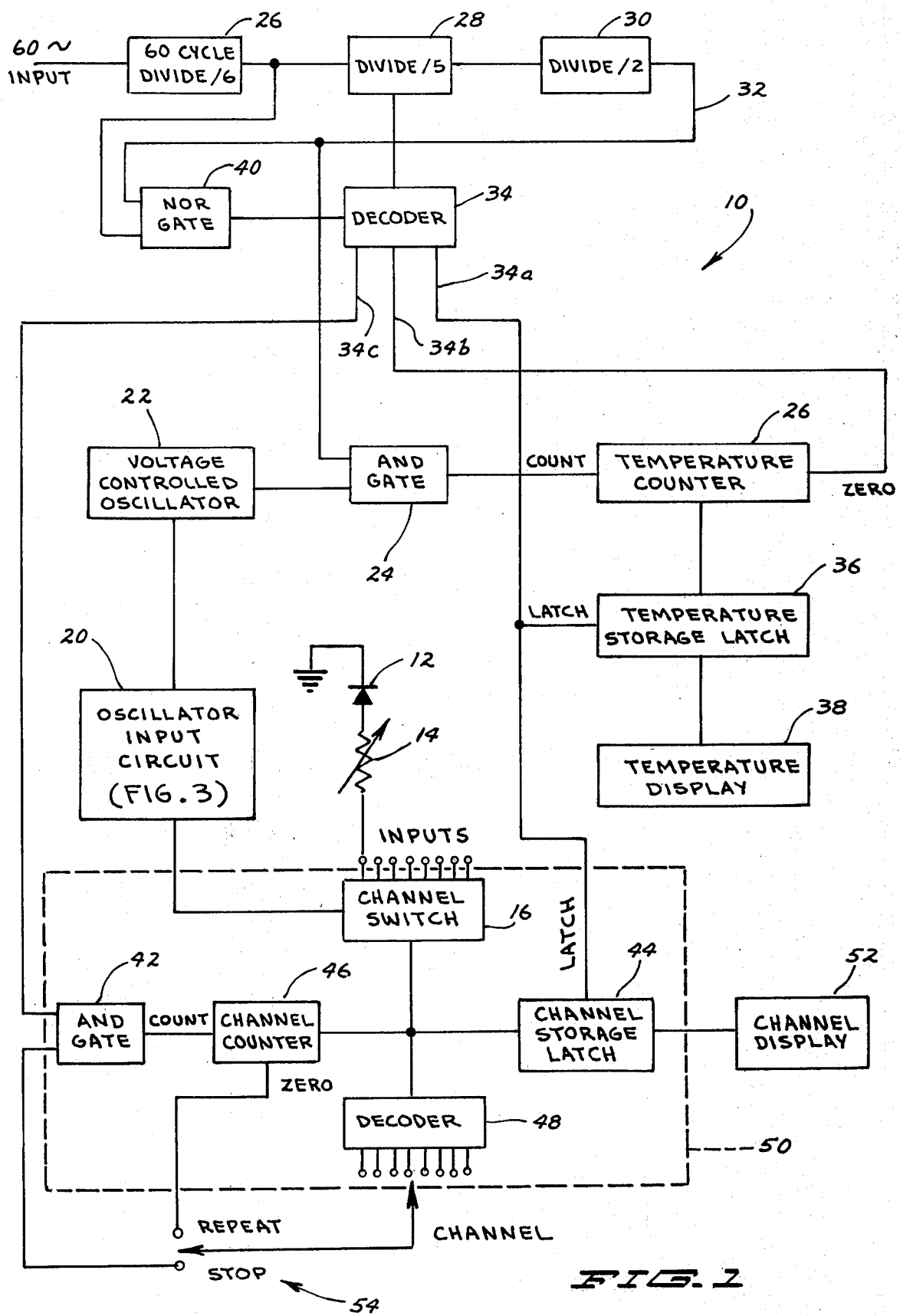
FIG. 2 is a chart showing timing pulses occurring in the device of FIG. 1.

Referring now to FIG. 1, a device 10, according to the present invention, is shown in circuit schematic form. A semiconductor diode 12 or thermal diode is shown connected through a variable resistor 14 to a channel switch 16 which forms part of a multiplexer 50 shown inside dashed lines. Resistor 14, sometimes known as a fine offset resistor, allows the circuit to be adjusted for slight variations in diode characteristics. Channel switch 16 has a multiplicity of inputs all of which may be connected to diodes in different locations so that a variety of environmental locations may be monitored. The output of the channel switch consists of an electrical connection with a diode selected by the switch, such as diode 12 connected through offset resistor 14. The output of the channel switch is connected to an oscillator input circuit 20, shown in detail in FIG. 3. The oscillator input circuit adapts voltage variations of the diode occuring with temperature to a varying voltage suitable for controlling a voltage controlled oscillator 22. Input circuit 20 will be described in greater detail in connection with FIG. 3.

Oscillator 22 is of the type having a variable frequency output depending upon variations of an input reference voltage. Such an oscillator is a standard commercially available item. It may for example take the form of a standard integrated circuit containing a multivibrator type of oscillator having a period of oscillation determined by the time required to charge a capacitor to a reference level from a current source. The control voltage from input circuit 20 alters the charging current producing a linear change of frequency with voltage. The output of voltage-controlled oscillator 22 is gated by AND gate 24 to a temperature counter 26. The AND gate 24 is operated to provide controlled, fixed time intervals during which the output cycles of the oscillator 22 are counted to reflect the temperature of the sensing diode. Thus the period of time during which the AND gate is selectively operated to transfer the count to the temperature counter 26 is carefully controlled by a timing cycle device.

The nominal 60 Hertz commercially available line current is a sufficiently accurate standard to provide accurate time intervals of the length required. To provide an appropriate time interval, the 60 Hertz input reference frequency is divided by a series of counters into the required time interval. Any particular chain of divide counters which provides the desired time interval is appropriate. The specific embodiment of this invention shown herein includes a first divide by 6 counter 26 with a divide by 5 counter 28 connected to that output and in turn a final divide by 2 counter 30. The chain of counters thus provides a total reduction of the 60 Hertz input into a 1 Hertz square wave output on line 32. This 1 Hertz output is provided in binary form to give ½ Hertz of true or binary one signal and ½ Hertz of not true or binary zero signal. Of course, the ½ Hertz outputs are each ½ second in duration. Thus AND gate 24 will allow positive or binary 1 outputs from the voltage controlled oscillator to pass to the temperature counter 26 during the ½ second, or ½ Hertz, during which the output of the divide by 2 counter, 30, is a binary 1.

A decoder 34 is connected to the output of the divide by 5 counter 28. The decoder 34 produces output signals which control among other things, a temperature storage latch 36 and the gating signal of the temperature counter 26. The decoder functions to reset the temperature counter 26 to 0 after the temperature count has been transferred to the temperature storage latch 36. This temperature storage latch is really a storage register. The gating signals from the decoder 34 act to cause the temperature storage latch to pick up the count from the temperature counter 26 after the completion of a ½ second timing interval and store that count. Thereafter the temperature counter is reset to 0 after the input to the temperature storage latch 36 is deactivated. That is, the temperature storage latch or register 36 will only store during a binary 1 input signal from the decoder 34. Thus the temperature counter can be used during an additional timing interval to obtain a new temperature reading while the old temperature reading is stored in the temperature storage latch 36.

A temperature display 38 of an appropriate type is connected to the storage latch 36 and will display the temperature of the sensed diode during the time intervals between successive new inputs to the storage latch. The temperature display 38 may consist of any form of output display, binary or decimal, plus the conversion circuitry to produce a decimal reading from binary input to produce the numerical count which of course translates to an equivalent temperature reading.

The decoder 34 is controlled by a NOR gate 40 which receives as its inputs the output from the divide by 6 counter 26 and the output from the divide by 2 counter 30. The NOR gate operates to turn on the signals from the decoder at appropriate timing intervals selected by the coincidence of the output of the divide by 2 counter and the divide by 6 counter. All of this is better shown by the timing chain sequence or control sequence shown in FIG. 2, as will be described subsequently.

The output of the decoder 34 is also connected to an AND gate 42 within the multiplexer 50. Another output from the decoder 34 is connected to the channel storage latch 44 within the multiplexer. These 2 signals are used to control the advancement of the inputs during a predetermined sequence during switching from sensing diode to another and to produce an output on a channel display indicator 52 which correlates to the temperature display 38. The channel display 52 always indicates the channel for which the temperature display is currently available. Thus the operator or observer of the unit sees simultaneously a temperature plus a channel indicator which tells him the location of the temperature sensing unit whose temperature is displayed. The AND gate 42 controls a channel counter 46 which is connected to channel switch 16 and decoder 48 which together indicate the selected channel connected with oscillator input circuit 20 and maintain a count of which channel is being observed. This also functions to control advancement, from one channel to the next after each timing interval. A repeat/stop switch 54 connected with AND gate 42, channel counter 46 and decoder 48 may be used to have the temperature of a single channel read repeatedly and updated or allow the device to continuously rotate through all channels.

Referring now to FIG. 2, the timing chain for the circuit of FIG. 1 is shown. The chains of pulses shown in the figure are labeled with respect to what they represent. Most significant in the figure is the relationship of the divide by 2 output signal 32 to the output signals of the decoder 34. These decode signals are labeled in FIG. 1 as 34a, 34b and 34c. These decode outputs are similarly labeled in FIG. 2. Referring now to both FIG. 1 and FIG. 2 for an explanation of the sequence of operation of the functions of the circuits of FIG. 1, NOR gate 40 acts to control decoder 34 in 2 ways. The input from divider 32 acts to allow the decoder to operate only during the time that AND gate 24 is disabled. That is, the decoder provides control signals for the circuit only during the time the temperature counter 26 is not used. The other input to the NOR gate, consisting of 10 Hertz pulses from divider 26 to control the timing of output pulses from the decoder when it is in the 0.5 second activated condition. Outputs 34a, 34b and 34c from decoder 34 consist of 0.1 second pulses which are delayed as shown in FIG. 2 to step sequence operations in the device. Decoder output 34a latches the new temperature count and channel, if switched, into displays 38 and 52, respectively. Decoder output 34b zeros the temperature counter in preparation for the next count interval. Decoder 34c advances the channel counter 46 to connect input circuit 20 to the next thermal diode.

By way of further explanation of FIG. 1, multiplexer 50 shown in dashed lines may consist of a standard MOS integrated circuit analog multiplexer. Channel counting is performed with a normal decade type counter and, in addition to the decoding in the multiplexer itself, a separate decode is used for control of channel sequencing. An 8 position channel switch 16, as shown, selects the output to either zero the channel counter to cycle through any number of channels or by way of the stop/repeat switch 54 to inhibit channel counting. This allows any channel to be selected for continuous display with no need for manual cycling. Storage latch 44 is used between the channel counter 46 and the channel display 52 to allow switching to a new channel while still displaying the correct channel for the previous temperature sample. As previously explained, channel storage latch 44 is controlled by the output 34a from decoder 34. Since the temperature count and channel count are latched simultaneously they are always in agreement.

Figure 3:
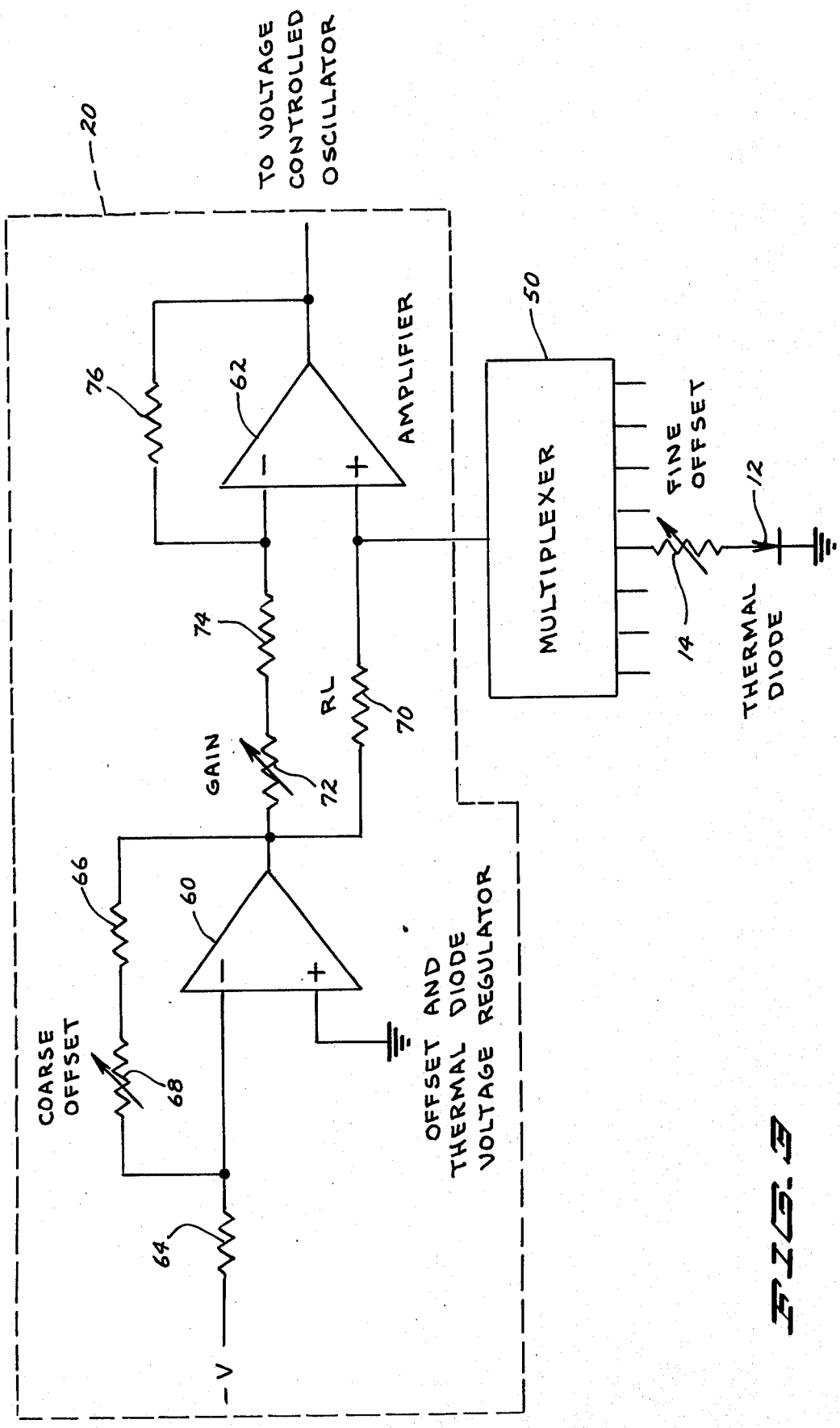
FIG. 3 is a detailed schematic of one portion of FIG. 1.

Referring now to FIG. 3 a first operational amplifier 60 and a second operational amplifier 62 are shown as the active elements of the oscillator input circuit 20. The first operational amplifier 60 has its positive input connected to ground and its negative input connected through a load resistor 64 to a negative source voltage. Resistor 66 and coarse offset adjustable resistor 68 bypass the output from amplifier 60 to its negative input to provide a feedback circuit. This amplifier 60 and its associated circuitry serves a dual function, providing a regulated voltage source for the thermal diode 12 shown in the circuit and, as well, providing an offset voltage function to change the output voltage from the thermal diode 12 to a suitable voltage range for controlling oscillator 22, shown in FIG. 1. Course offset control 68 is adjusted for the circuit itself while a fine offset control 14 is provided to adjust for the individual characteristics of each diode and the signal wires leading to the respective diodes. The diode is connected as the positive input to differential amplifier 62 and connects through a load resistor 70 to the output of amplifier 60. The negative input to amplifier 62 consists of a variable gain control resistor 72 and a fixed load resistor 74. Feedback resistor 76 is connected between the output of amplifier 62 and the negative input. This amplifier configuration allows for any fluctuations in the regulated diode voltage supply to be presented to the amplifier 62 as a common mode input so that the output of the circuit reflects only variations produced by the diode 12 and none produced by the variations in the voltage of the diode voltage source.

Thus the present invention has among its advantages the following: The power supply for the temperature diode is provided from a source used to adjust the voltage reference level for the circuit and also provides a voltage offset as an output so that the inputs are provided as common mode inputs to a differential amplifier. The diode voltage is the only source of variability of the output of that amplifier. A voltage controlled oscillator is used in digitizing temperature related signal and the 60 cycle power line frequency is used as a standard for controlling the timing sequence of operations by the digitizer circuit. It can be seen that short time stability of the device is mainly a function of the offset power supply which translates the diode voltage from the normal approximately 0.5 volt at 0° to the value required by the particular voltage controlled oscillator used in the circuit. To allow the use of ordinary 3 terminal integrated power supply regulators and a standard operational amplifier offset regulator, the thermal diode current is taken from the offset regulator through load resistance 70. Thus power source fluctuations appear as common mode inputs to the diode voltage amplifier and are therefore attenuated in the output. Since the diode is supplied from a constant voltage source through a relatively high resistance, the input to the amplifier is the diode voltage plus the fixed fine trim resistance voltage drop.

What is claimed is:

1. A semiconductor diode temperature sensing device comprising,
    a semiconductor diode,
    a first differential amplifier, for providing a regulated voltage for said diode, the positive input to said amplifier being connected to ground,
    a load resistor connected to the negative input of said amplifier and adapted to be connected to a voltage source,
    a variable resistance feedback network connected between the output of said amplifier and the negative input of said amplifier,
    a second differential amplifier, the positive input of said amplifier being operatively connected with said diode,
    a diode load resistor connected between the output of said first amplifier and the positive input of said second amplifier,
    a resistance connected between the output of said first amplifier and the negative input of said second amplifier, and a feedback network connected between the negative input of said second amplifier and the output of said second amplifier.

2. A semiconductor diode temperature sensing device comprising,
    a semiconductor diode,
    a first differential amplifier having first and second inputs, for providing a regulated voltage for said diode, the first input of said amplifier being connected to ground,
    a resistance connected to the second input of said amplifier and adapted to be connected to a voltage source,
    a feedback network connected between the output of said amplifier and the second input of said amplifier,
    a second differential amplifier having first and second inputs the first input of said amplifier being operatively connected with said diode,
    a resistance connected between the output of said first amplifier and the first input of sad second amplifier, and
    a resistance connected between the output of said first amplifier and the second input of said second amplifier.

3. The device of claim 2 wherein said feedback network is variable for purposes of calibrating the device.

4. The device of claim 2 wherein said diode is connected through a resistor to said second amplifier.

5. A semiconductor diode temperature sensing device comprising
    at least one semiconductor diode,
    a voltage controlled oscillator,
    an oscillator input circuit connected to said oscillator for providing a variable output voltage to said oscillator in response to variations in the voltage of said diode caused by temperature,
    said oscillator input circuit comprising a first differential amplifier having first and second inputs, for providing a regulated voltage for said diode, the first input of said amplifier being connected to ground, a resistance connected to the second input of said amplifier and adapted to be connected to a voltage source, the feedback network connected between the output of said amplifier and the second input of said amplifier, a second differential amplifier, having first and second inputs, first input of said amplifier being operatively connected with said diode, a resistance connected between the output of said first amplifier and the first input of said second amplifier, and a resistance connected between the output of said first amplifier and the second input of said second amplifier,
    means connected to said oscillator input circuit for connecting said circuit to said semiconductor diode and having a plurality of channels to which semiconductor diodes may be connected, said means being responsive to control signals for switching the channel to which said input circuit is connected,
    gate means connected to said oscillator, responsive to control signals, for selectively gating the output of said oscillator,
    counter means connected to said gate means for counting the output cycles of said oscillator when gated by said gate means,
    decoder means for supplying control signals to said means for connecting to cause channel switching and to said counter means to restore said counter to zero, and
    means for timing, connected to a reference frequency, said means being connected to said gate means to control the time interval that signals from said oscillator are gated to said counter and said means being connected to said decoder means to provide time reference signals to said decoder means for use in developing control signals.

* * * * *